(12) United States Patent
Hur

(10) Patent No.: US 9,383,849 B2
(45) Date of Patent: Jul. 5, 2016

(54) DISPLAY DEVICE INTEGRATED WITH TOUCH SCREEN PANEL

(71) Applicant: SAMSUNG DISPLAY CO., LTD., Yongin, Gyeonggi-Do (KR)

(72) Inventor: Yong-Koo Hur, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 67 days.

(21) Appl. No.: 13/971,814

(22) Filed: Aug. 20, 2013

(65) Prior Publication Data
US 2014/0210738 A1 Jul. 31, 2014

(30) Foreign Application Priority Data

Jan. 28, 2013 (KR) .................. 10-2013-0009073

(51) Int. Cl.
*G06F 3/041* (2006.01)
*G06F 3/044* (2006.01)
*G02F 1/1333* (2006.01)

(52) U.S. Cl.
CPC .............. *G06F 3/0412* (2013.01); *G06F 3/044* (2013.01); *G06F 3/0416* (2013.01); *G02F 1/13338* (2013.01)

(58) Field of Classification Search
CPC ......... G06F 3/01; G06F 3/041; G06F 3/0412; G06F 3/0416; G06F 3/0418; G06F 3/044; G06F 2203/04103; G02F 1/133308; G02F 1/13338; G02F 1/13452; G02F 1/13458; G02F 2001/133388; G09G 2300/0426; G09G 2300/0421
USPC .............. 345/104, 173–178; 349/58, 60, 139, 349/147, 149–160, 162, 190; 178/18.06, 178/20.01

See application file for complete search history.

(56) References Cited

U.S. PATENT DOCUMENTS

| | | | |
|---|---|---|---|
| 7,215,331 B2 * | 5/2007 | Song et al. ..................... 345/173 |
| 7,609,252 B2 * | 10/2009 | Horikawa et al. ............. 345/173 |
| 2008/0143683 A1 * | 6/2008 | Hotelling ....................... 345/173 |
| 2008/0158181 A1 * | 7/2008 | Hamblin et al. .............. 345/173 |
| 2010/0110041 A1 * | 5/2010 | Jang .............................. 345/174 |
| 2010/0194697 A1 * | 8/2010 | Hotelling et al. ............. 345/173 |
| 2012/0062486 A1 | 3/2012 | Rho |
| 2012/0105339 A1 | 5/2012 | Jung |
| 2012/0194467 A1 * | 8/2012 | Huang et al. .................. 345/174 |
| 2012/0292105 A1 * | 11/2012 | Fujita ..................... H05K 3/321 174/84 R |
| 2013/0050130 A1 * | 2/2013 | Brown .......................... 345/174 |
| 2013/0057512 A1 * | 3/2013 | Lillie et al. .................... 345/174 |
| 2013/0093722 A1 * | 4/2013 | Noguchi ............... G06F 3/0412 345/174 |
| 2014/0168152 A1 * | 6/2014 | Ishizaki ................ G06F 3/044 345/174 |
| 2014/0375907 A1 * | 12/2014 | Wu ........................ G06F 3/044 349/12 |

FOREIGN PATENT DOCUMENTS

| | | |
|---|---|---|
| KR | 2000-0043821 A | 7/2000 |
| KR | 10-2012-0028009 | 3/2012 |
| KR | 10-2012-0045291 | 5/2012 |

* cited by examiner

*Primary Examiner* — Keith Crawley
(74) *Attorney, Agent, or Firm* — Lewis Roca Rothgerber Christie LLP

(57) ABSTRACT

Provided is a display device integrated with a touch screen panel including a display unit including a plurality of pixels at a sealed region between a lower substrate and an upper substrate; first touch electrodes extending in a first direction on the upper substrate over the sealed region, wherein ends of the first touch electrodes extend to a non-sealed region on the lower substrate; and a sloped portion beneath the first touch electrodes at a boundary between the sealed region and the non-sealed region.

11 Claims, 4 Drawing Sheets

DISPLAY DEVICE INTEGRATED WITH TOUCH SCREEN PANEL

CROSS-REFERENCE TO RELATED APPLICATION

This application claims priority to and the benefit of Korean Patent Application No. 10-2013-0009073, filed on Jan. 28, 2013, in the Korean Intellectual Property Office, the entire content of which is incorporated herein by reference.

BACKGROUND

1. Field

An aspect of the present invention relates to a display device integrated with a touch screen panel.

2. Description of the Related Art

A touch screen panel is an input device that allows a user's instruction to be input by selecting an instruction content displayed on a screen of a display device or the like with a user's hand or object.

To this end, the touch screen panel is formed on a front face of the display device to convert a contact position into an electrical signal. Here, the user's hand or object is directly in contact with the touch screen panel at the contact position. Accordingly, the instruction content selected at the contact position is input as an input signal to the image display device.

Because such a touch screen panel can be substituted for a separate input device connected to a display device, such as a keyboard or mouse, its application in various fields has been growing.

The touch screen panel has conductive sensing electrodes in a screen area, on which an image is displayed, so as to recognize a touch event occurring in the screen area as an input signal. That is, in a display device integrated with the touch screen panel, the screen area is a display area on which an image is displayed and an active area on which a touch input is possible.

The touch screen panel is generally configured to be attached to an outer face of a display device such as a liquid crystal display device or organic light emitting display device. In a case where the touch screen panel and the display device, which are separately manufactured, are attached to each other, the entire thickness of a product is increased, and manufacturing cost is increased.

SUMMARY

Embodiments provide a display device integrated with a touch screen panel, which can prevent a disconnection failure while being implemented to be thin.

According to an aspect of the present invention, there is provided a display device integrated with a touch screen panel including: a display unit including a plurality of pixels formed in a sealed region between a lower and an upper substrate; first touch electrodes extending in a first direction on the upper substrate over the sealed region, wherein ends of the first touch electrodes extend up to a non-sealed region on the lower substrate; and a sloped portion beneath the first touch electrodes at a boundary between the sealed region and the non-sealed region.

The first touch electrodes may extend from a region over the sealed region on the upper substrate to the non-sealed region on the lower substrate via an upper side of the sloped portion.

The first touch electrodes may have a line shape, and the first touch electrodes may extend from a region over the sealed region on the upper substrate to the non-sealed region on the lower substrate via an upper side of the sloped portion.

Pads of the first touch electrodes may be at the non-sealed region on the lower substrate so as to be on the same line as pads for driving the pixels of the display device.

The sloped portion may include a reinforcing material and may be at one side of the upper substrate so as to graduate an elevation difference caused by the upper substrate at the boundary between the sealed region and the non-sealed region.

The sloped portion may be formed by patterning one end of the upper substrate, at the boundary between the sealed region and the non-sealed region, to be sloped.

The display device may further include second touch electrodes extending in a second direction intersecting the first direction, and facing the first touch electrodes.

The second touch electrodes may be formed at the sealed region.

The display device may further include outer lines coupled to the second touch electrodes and extending from the sealed region to the non-sealed region on the lower substrate, wherein pads coupled to the outer lines may be on the same line as the pads of the first touch electrodes.

The second touch electrodes may be formed by patterning at least one electrode selected from electrodes constituting each pixel.

The second touch electrodes may be formed by patterning a cathode electrode or a common electrode.

As described above, according to embodiments the present invention, it is possible to provide a display device integrated with a touch screen panel, in which touch electrodes for implementing the touch screen panel may be formed on an upper substrate and/or a lower substrate of a display panel, thereby implementing a thin display device.

For example, embodiments of the present invention provide a structure in which the touch electrodes formed on the upper substrate of the display panel may be formed to extend up to a non-sealed region on the lower substrate of the display panel, thereby simplifying a coupling process of the display device to a flexible circuit board. Further, a sloped portion may be provided to reduce a step difference occurring at the boundary between a sealed region and the non-sealed region, thereby effectively decreasing the possibility of or preventing a disconnection failure of the touch electrodes.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
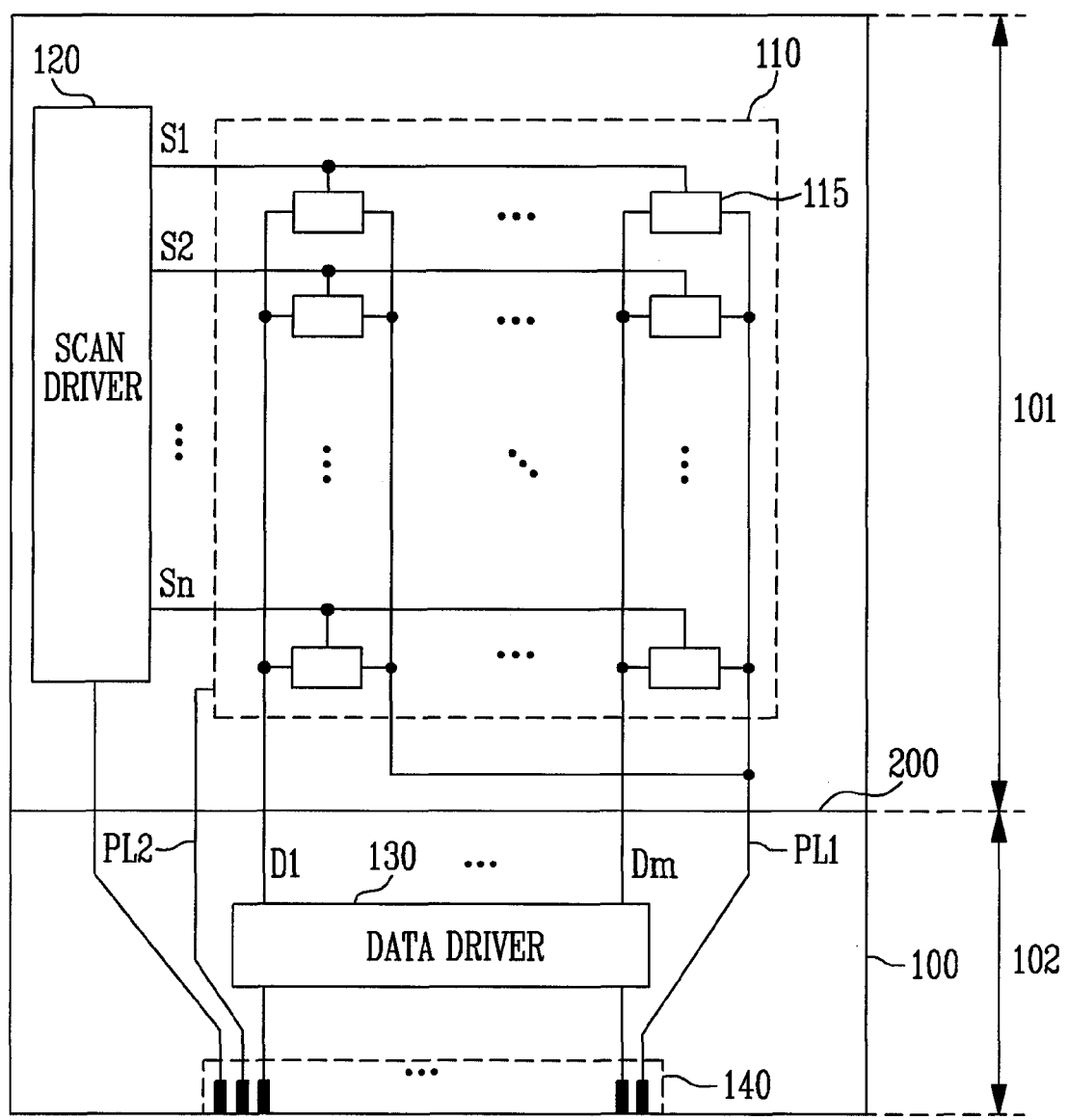
FIG. 1 is a plan view showing an example of a display device.

Hereinafter, certain exemplary embodiments according to the present invention will be described with reference to the accompanying drawings. Here, when a first element is described as being coupled to a second element, the first element may be directly coupled to the second element or may be indirectly coupled to the second element via a third element. Further, some of the elements that are not essential to the complete understanding of the invention are omitted for clarity. Also, like reference numerals refer to like elements throughout.

FIG. 1 is a plan view showing an example of a display device. Particularly, a display panel of the display device is shown in FIG. 1.

Referring to FIG. 1, the display device includes a display unit 110, a scan driver 120, a data driver 130 and a pad unit 140.

The display unit 110 includes a plurality of pixels 115 positioned at crossing regions of scan lines S1 to Sn and data lines D1 to Dm. The display unit 110 displays an image, corresponding to scan signals supplied through the scan lines S1 to Sn, data signals supplied through the data lines D1 to Dm, and driving power supplied through the power lines PL1 and PL2.

The scan driver 120 generates scan signals, corresponding to a scan control signal supplied from outside of the scan driver 120, and supplies the generated scan signals to the pixels 115 through the scan lines S1 to Sn.

The data driver 130 generates data signals, corresponding to data and data control signals supplied from outside of the data driver 130, and supplies the generated data signals to the pixels 115 through the data lines D1 to Dm.

The pad unit 140 includes a plurality of pads P through which power lines and/or signal lines coupled to the display unit 110, the scan driver 120, the data driver 130, and the like are coupled to an external power circuit, driving circuit, or the like.

In the display panel of the display device, some components, particularly, at least the display unit 110 may be positioned in a sealed region 101 formed (or located) between a lower substrate 100 and an upper substrate 200. The other components, e.g., the data driver 130, the pad unit 140, and the like may be positioned in a non-sealed region 102 on the lower substrate 100 which is not covered by the upper substrate 200.

However, a touch screen panel having touch electrodes for sensing a touch and its position may be additionally implemented in order to provide a touch input function to the display device. The touch electrodes may be generally arranged on the display panel, and the shape and driving method of the touch electrodes may be selectively applied to be suitable for implementing various touch screen panels, such as a resistive type touch screen panel and a capacitance type touch screen panel.

Figure 2:
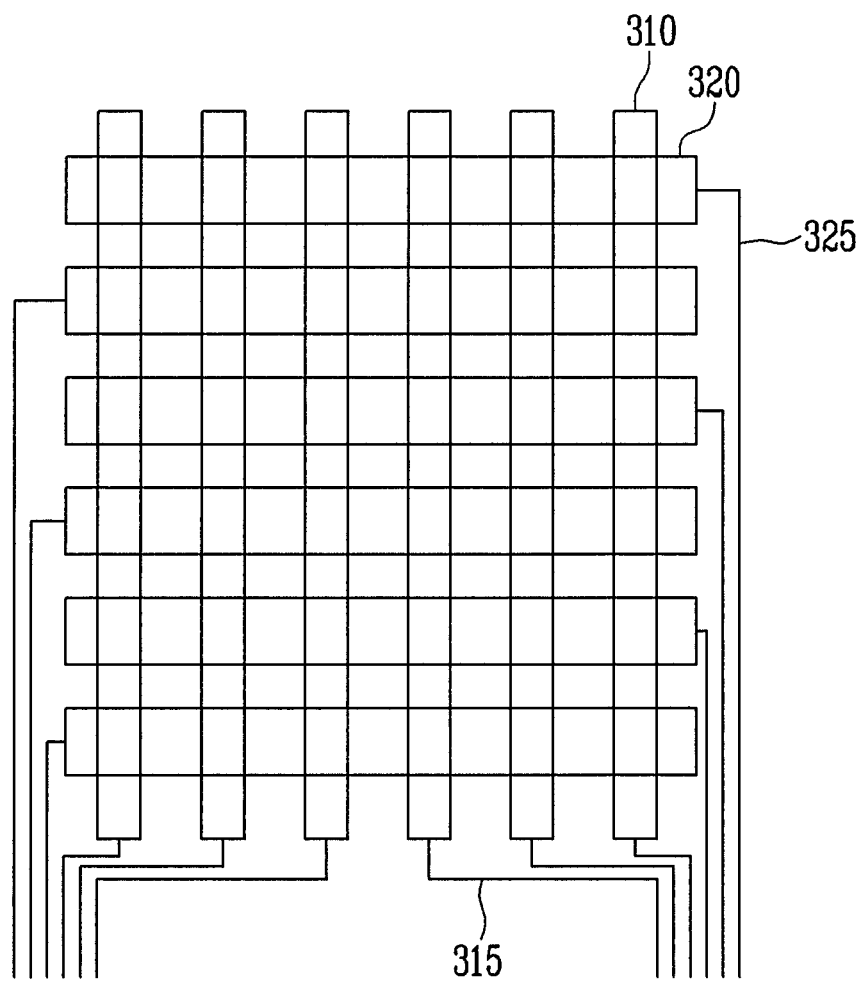
FIG. 2 is a plan view showing the structure of a touch screen panel according to an embodiment of the present invention.

FIG. 2 is a plan view showing the structure of a touch screen panel according to an embodiment of the present invention. For convenience of illustration, the capacitive touch screen panel will be shown as an example in FIG. 2.

Referring to FIG. 2, the touch screen panel according to this embodiment includes first touch electrodes 310 and second touch electrodes 320, formed to face each other in crossing directions, and first and second outer lines 315 and 325 respectively connected to the first and second touch electrodes 310 and 320.

The first touch electrodes 310 are arranged in plural numbers along a second direction, e.g., a horizontal direction intersecting a first direction, e.g., a vertical direction, while being formed elongated (or extending) in the first direction. The first touch electrodes 310 may be set as, for example, Rx electrodes of a mutual capacitance type touch screen panel. The first touch electrodes 310 may be coupled to a touch driving circuit through the first outer lines 315 coupled thereto. Thus, if a change in capacitance occurs due to a touch input, the change may be transmitted to the touch driving circuit via the first touch electrode at the touch point and the first outer line coupled to the first touch electrode.

The second touch electrodes are arranged in plural numbers along the first direction while being formed elongated (or extending) along the second direction, e.g., the horizontal direction intersecting (e.g., perpendicular to) the first direction in which the first touch electrodes 310 are formed (or extend). The second touch electrodes 320 may be set as, for example, Tx electrodes of the mutual capacitance type touch screen panel. The second touch electrodes 320 may be coupled to the touch driving circuit through the second outer lines 325 coupled thereto, so as to receive a touch driving signal supplied from the touch driving circuit.

For example, the touch screen panel may sense a touch and its position by supplying an AC-type touch driving signal to the second touch electrodes 320 and detecting a change in capacitance applied to the first touch electrodes 310 when the voltage level of the touch driving signal is changed.

Figure 3:
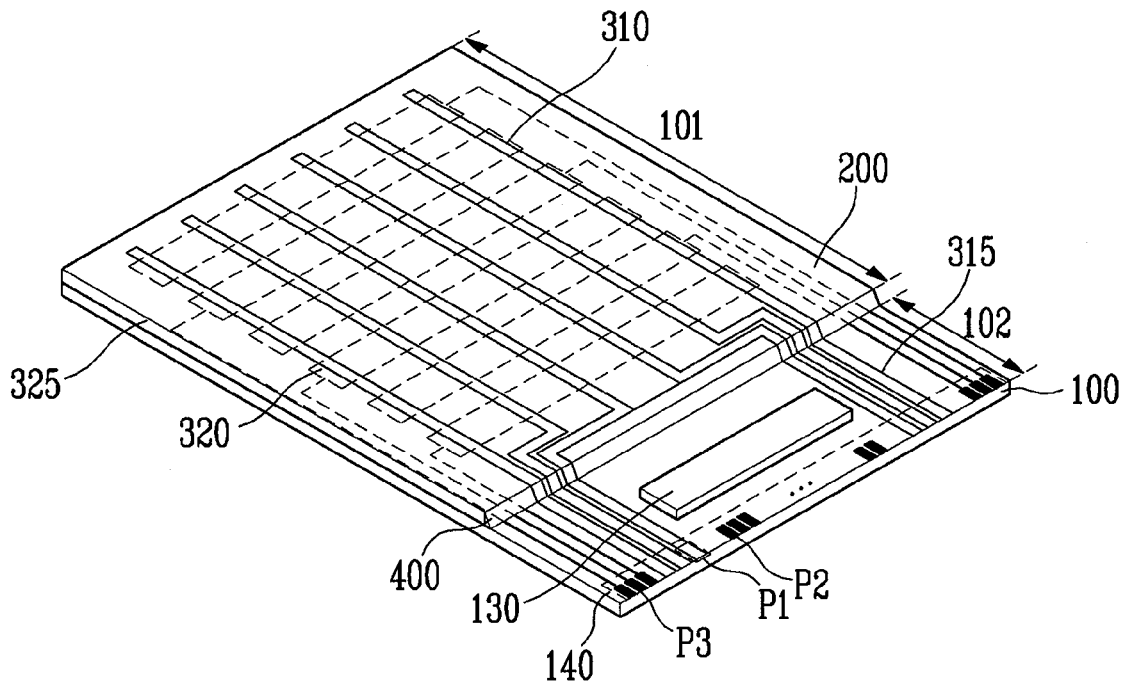
FIG. 3 is a perspective view showing a display device integrated with a touch screen panel according to an embodiment of the present invention.
Figure 4:
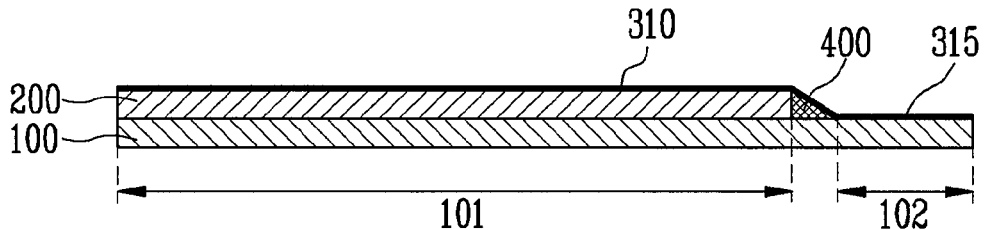
FIG. 4 is a side sectional view of the display device shown in FIG. 3.

FIG. 3 is a perspective view showing a display device integrated with a touch screen panel according to an embodiment of the present invention. FIG. 4 is a side sectional view of the display device shown in FIG. 3.

For convenience, key components of embodiments according to the present invention, including touch electrodes, are primarily illustrated in FIGS. 3 and 4, and the illustration of a display unit, a scan driver, and the like will be omitted. However, as shown in FIG. 1, at least a display unit is formed in a sealed region between lower and upper substrates. In addition, components, e.g., a data driver and the like, similar or identical to those of FIG. 1 are designated by like reference numerals, and their detailed description will be omitted.

Referring to FIG. 3, the display device integrated with the touch screen panel according to this embodiment includes first touch electrodes 310 and second touch electrodes 320, which may be formed on a lower substrate 100 and/or on an upper substrate 200 of the display device so as to be integrally implemented with a display panel and constitute the touch screen panel.

The first touch electrodes 310 are formed in a first direction on an upper substrate 200 over a sealed region 101. One ends of the first touch electrodes 310 are formed to extend up to a non-sealed region 102 on a lower substrate 100.

The first touch electrodes 310 may be implemented, for example, by forming metal such as silver (Ag) to be integrally coupled from a region over the sealed region 101 on the upper substrate 200 to the non-sealed region 102 on the lower substrate 100, using a printing technique.

For example, the first touch electrodes 310 may be integrally implemented with first outer lines 315 while being formed in a line shape integrally coupled from the region over the sealed region 101 on the upper substrate 200 to the non-sealed region 102 on the lower substrate 100.

If the first touch electrodes 310 are formed through the printing technique as described above, unit cost may be reduced as compared with line formation through a photo process or the like. The first touch electrodes 310 may be easily formed on a thin plastic substrate as well as a glass substrate, so that the display device may be usefully applied to a flexible display device and the like.

If the one ends of the first touch electrodes 310 extend up to the non-sealed region 102 on the lower substrate 100, touch pads P1 for coupling the first touch electrodes 310 to the touch driving circuit may be formed in the non-sealed region 102 on the lower substrate 100, like pads P2 for driving the pixels. The touch pads P1 can also be arranged on the same line as the pads P2 of the display device, so that it is possible to easily perform a coupling process of the display device to a flexible circuit board (not shown) or the like.

Here, the pads P1 of the first touch electrodes 310 may be integrally formed with the first touch electrodes 310, or may be separately formed to be electrically coupled to the first touch electrodes 310.

The second touch electrodes 320 are formed to face the first touch electrodes 310. The second touch electrodes 320 are formed in a second direction to intersect the first touch electrodes 310. When being applied to the display device integrated with the touch screen panel, the second touch electrodes 320 may be formed on the lower or upper substrate 100 or 200 provided in the display panel of the display device.

For example, the second touch electrodes 320 may be formed in the sealed region 101 between the lower and upper substrates 100 and 200. In this case, the second touch electrodes 320 may be implemented by patterning at least one electrode selected from electrodes constituting each pixel.

That is, the second touch electrodes 320 may be formed by patterning a cathode electrode of an organic light emitting display device, a common electrode of a liquid crystal display device, and the like. In addition, the display device integrated with the touch screen panel may be driven by applying a time-division method of applying a cathode voltage or common voltage to the second touch electrodes 320 when the pixels are driven, and supplying a touch driving signal to the second touch electrodes 320 when the touch screen panel is driven.

The second touch electrodes 320 may be coupled to an external driving circuit through outer lines coupled thereto, i.e., second outer lines 325. The second outer lines 325 extend from the sealed region 101 to a pad unit 140 located (or disposed) in the non-sealed region 102 on the lower substrate 100. Pads P3 coupled to the second outer lines 325 may be arranged, for example, on the same line as the pads P1 of the first touch electrodes 310.

According to the present invention, the touch electrodes 310 and 320 for implementing the touch screen panel may be formed on the lower substrate 100 and/or on the upper substrate 200 of the display device, thereby implementing a thin display device integrated with the touch screen panel.

Particularly, the first touch electrodes 310 for recognizing a user's touch input may be formed on the upper substrate 200 to be close to the user. The first touch electrodes 310 may be formed to extend from an upper portion of the upper substrate 200 to the non-sealed region 102 on the lower substrate 100 through the printing technique, so that it is possible to easily perform a manufacturing process, to reduce unit cost, and to easily apply the display device to a flexible display device.

However, in a case where the first touch electrodes are formed as described above, a step (e.g., elevation) difference generally occurs at the boundary between the sealed region 101 and the non-sealed region 102 due to the upper substrate 200, and therefore, a disconnection failure of the first touch electrodes 310 may occur.

Thus, in embodiments of the present invention, a sloped portion 400 is formed (or disposed) at the boundary between the sealed region 101 and the non-sealed region 102 so as to reduce (or graduate) the step (e.g., elevation) difference beneath the first touch electrodes 310, thereby preventing the disconnection failure of the first touch electrodes 310.

For example, the sloped portion 400, as shown in FIG. 4, may be formed of a reinforcing material formed to be sloped (e.g., sloped with a predetermined angle) at one side of the upper substrate 200, using an organic material and/or an inorganic material, so that the step difference caused by the upper substrate 200 is reduced at the boundary between the sealed region 101 and the non-sealed region 102.

If the sloped portion 400 is formed as described above, the first touch electrodes 310 may be integrally coupled from the region over the sealed region 101 on the upper substrate 200 to the non-sealed region 102 of the lower substrate 100 via the upper end of the sloped portion 400, and the step (e.g., elevation) difference is reduced (or graduated) by the sloped portion 400 at the boundary between the sealed region 101 and the non-sealed region 102, thereby securing the stability of the first touch electrodes 310.

As described above, according to embodiments of the present invention, it is possible to provide a display device integrated with a touch screen panel, which can reduce (or prevent) a disconnection failure while implemented to be thin.

Figure 5:
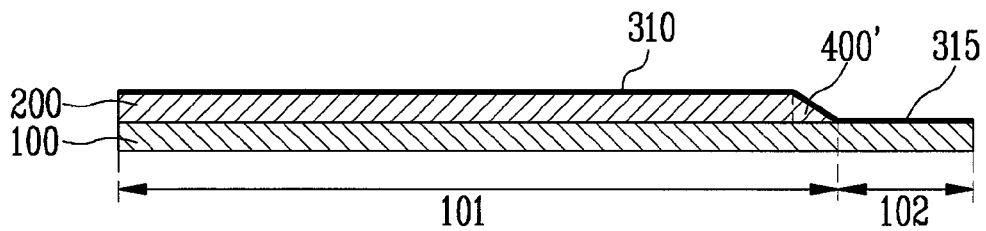
FIG. 5 is a side sectional view of a display device integrated with a touch screen panel according to another embodiment of the present invention.

FIG. 5 is a side sectional view of a display device integrated with a touch screen panel according to another embodiment of the present invention. In FIG. 5, components similar or identical to those of FIG. 4 are designated by like reference numerals, and their detailed description will be omitted.

Referring to FIG. 5, a sloped portion 400' is patterned (or formed) so that one side of the upper substrate 200 positioned at the boundary between the sealed region 101 and the non-sealed region 102 is sloped. Thus, the sloped portion 400' may be integrally implemented with the upper substrate 200.

In this embodiment, the first touch electrodes 310 are integrally coupled from the region over the sealed region 101 on the upper substrate 200 to the non-sealed region 102 on the lower substrate 100 via the upper end of the sloped portion 400' at the one side of the upper substrate 200 patterned (or formed) to be sloped. Thus, the step (e.g. elevation) difference is reduced by the sloped portion 400' at the boundary between the sealed region 101 and the non-sealed region 102, and may thereby secure the stability of the first touch electrodes 310.

If the first touch electrodes 310 are formed to extend up to the non-sealed region 102 on the lower substrate 100 as described above, a test for detecting a short circuit or disconnection failure of the first touch electrodes 310 may also be performed when a sheet unit test for testing a plurality of display panels at a time before the plurality of display panels are formed on a mother board and then separated into individual display panels. Hereinafter, this will be described in detail with reference to FIG. 6.

Figure 6:
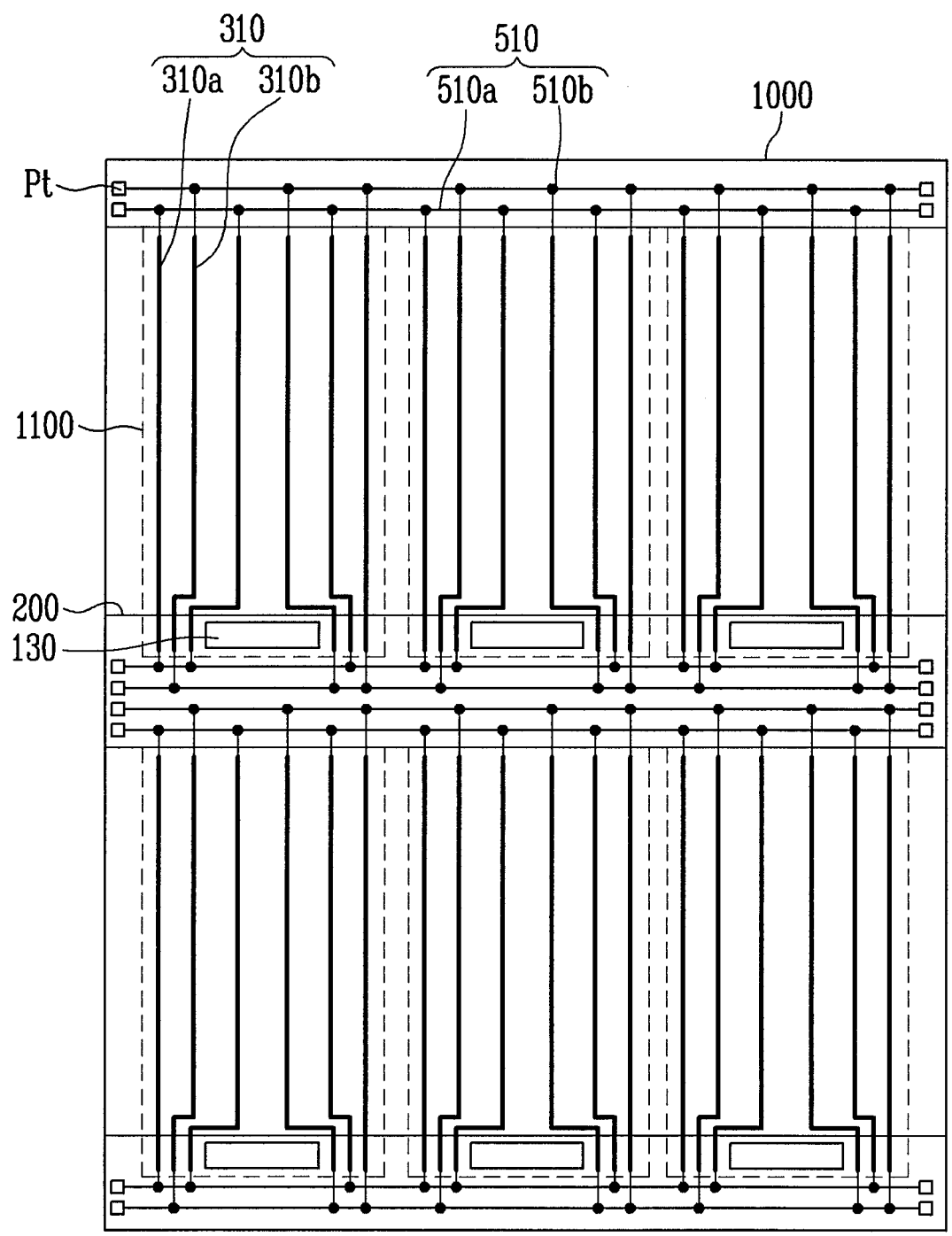
FIG. 6 is a plan view schematically showing an example of a mother board on which the display device is formed according to an embodiment of the present invention.

FIG. 6 is a plan view schematically showing an example of a mother board on which the display device is formed according to an embodiment of the present invention.

Referring to FIG. 6, sheet unit test lines 510 for detecting a short circuit or disconnection failure of the first touch electrodes 310 may be formed in a dummy region on the mother board 1000 that become lower substrates of a plurality of display panels 1100.

For example, sheet unit test lines 510 may be formed at both upper and lower portions of display panels 1100 arranged on each horizontal line, and the upper and lower ends of the first touch electrodes 310 may be coupled to the unit test lines 510 at the upper and lower portions of the display panels 1100, respectively. If a test signal is applied and detected through pads Pt of the sheet unit test lines 510, the disconnection failure of the first touch electrodes 310 may be detected.

If adjacent first touch electrodes 310 are coupled to different sheet unit test lines 510, the short circuit failure of the first touch electrodes 310 may also be detected. For example, if odd-numbered first touch electrodes 310*a* are coupled to first sheet unit test lines 510*a* and even-numbered first touch electrodes 310 are coupled to second sheet unit test lines 510*b*, the short circuit failure between the odd-numbered and even-numbered touch electrodes 310*a* and 310*b* may also be detected.

According to embodiments of the present invention, the first touch electrodes 310 may be easily formed on the mother board 1000 through a printing technique or the like. In addition, the first touch electrodes 310 may be coupled to the outside of each display panel 1100. Thus, it is possible to more easily test a short circuit or disconnection failure of the first touch electrodes 310 on the mother board 1000 as shown in FIG. 6.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display device integrated with a touch screen panel comprising:
    a display unit comprising a plurality of pixels at a sealed region between a lower substrate and an upper substrate;
    first touch electrodes extending in a first direction on an upper surface of the upper substrate over the sealed region, the upper surface of the upper substrate facing away from the display unit, and ends of the first touch electrodes extending to a non-sealed region on the lower substrate; and
    a sloped portion extending from one end of the upper substrate to be integral with the upper substrate at a boundary between the sealed region and the non-sealed region, the sloped portion being beneath the first touch electrodes and filling an area between the lower substrate and the upper substrate at the boundary between the sealed region and the non-sealed region.

2. The display device of claim 1, wherein the first touch electrodes extend from a region over the sealed region on the upper substrate to the non-sealed region on the lower substrate via an upper side of the sloped portion.

3. The display device of claim 1, wherein the first touch electrodes have a line shape, and the first touch electrodes extend from a region over the sealed region on the upper substrate to the non-sealed region on the lower substrate via an upper side of the sloped portion.

4. The display device of claim 1, wherein pads of the first touch electrodes are at the non-sealed region on the lower substrate so as to be with pads for driving the pixels of the display device.

5. The display device of claim 1, wherein the sloped portion is formed by patterning the one end of the substrate, at the boundary between the sealed region and the non-sealed region, to be sloped.

6. The display device of claim 1, further comprising second touch electrodes extending in a second direction intersecting the first direction, and facing the first touch electrodes.

7. The display device of claim 6, wherein the second touch electrodes are foimed at the sealed region.

8. The display device of claim 7, further comprising outer lines coupled to the second touch electrodes and extending from the sealed region to the non-sealed region on the lower substrate,
    wherein pads coupled to the outer lines are aligned with pads of the first touch electrodes.

9. The display device of claim 6, wherein the second touch electrodes are formed by patterning at least one electrode selected from electrodes constituting each pixel.

10. The display device of claim 9, wherein the second touch electrodes are formed by patterning a cathode electrode or a common electrode.

11. The display device of claim 1, further comprising second touch electrodes extending in a second direction intersecting the first direction on the lower substrate.

* * * * *